US010682016B2

(12) United States Patent
Koetz

(10) Patent No.: US 10,682,016 B2
(45) Date of Patent: Jun. 16, 2020

(54) FOOD PROCESSOR

(71) Applicant: Vorwerk & Co. Interholding GmbH, Wuppertal (DE)

(72) Inventor: Hendrik Koetz, Witten (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 152 days.

(21) Appl. No.: 14/647,481

(22) PCT Filed: Nov. 27, 2013

(86) PCT No.: PCT/EP2013/074798
§ 371 (c)(1),
(2) Date: May 27, 2015

(87) PCT Pub. No.: WO2014/083022
PCT Pub. Date: Jun. 5, 2014

(65) Prior Publication Data
US 2015/0305567 A1    Oct. 29, 2015

(30) Foreign Application Priority Data

Nov. 29, 2012 (DE) .......... 10 2012 111 603

(51) Int. Cl.
*A47J 43/07* (2006.01)
*A47J 43/046* (2006.01)
(Continued)

(52) U.S. Cl.
CPC .............. *A47J 43/07* (2013.01); *A47J 43/046* (2013.01); *A47J 43/0716* (2013.01);
(Continued)

(58) Field of Classification Search
CPC . A47J 43/07; A47J 43/0716; B01F 15/00279; B01F 15/00311; B01F 15/06; B01F 2015/062; B01F 2215/0014
(Continued)

(56) References Cited

U.S. PATENT DOCUMENTS 2,815,193 A    12/1957  Brown
3,943,421 A *   3/1976  Shibata .................. H02P 25/14
                                                       318/272
(Continued)

FOREIGN PATENT DOCUMENTS

CN       202051534 U      11/2011
DE    10 2007 059 236 A1   6/2009
(Continued)

OTHER PUBLICATIONS

Internet Archive Web Page: https://web.archive.org/web/20081019000620/http://www.plasma2002.com/blenderdefender/ as found archived on Oct. 19, 2008, 11 pages. Retrived on Jan. 6, 2017.*
(Continued)

*Primary Examiner* — Tony G Soohoo
(74) *Attorney, Agent, or Firm* — Collard & Roe, P.C.

(57) ABSTRACT

An electrically operated food processor with a mixing bowl and a mixer in the mixing bowl is provided with a camera, in particular an electronic camera, which is potentially directed towards the user of the food processor, and with stored gesture recognition software, as well as a gesture data bank, it being possible to use gesture recognition to cause the food processor to carry out a routine task.

20 Claims, 3 Drawing Sheets

(51) Int. Cl.
  *B01F 15/00* (2006.01)
  *B01F 15/06* (2006.01)
(52) U.S. Cl.
  CPC .. *B01F 15/00279* (2013.01); *B01F 15/00311* (2013.01); *B01F 15/06* (2013.01); *B01F 2015/062* (2013.01); *B01F 2215/0014* (2013.01)
(58) Field of Classification Search
  USPC .............................. 366/601, 144, 342, 206
  See application file for complete search history.

(56) References Cited

U.S. PATENT DOCUMENTS

| | | | | |
|---|---|---|---|---|
| 5,156,867 | A * | 10/1992 | Leuthold | A23G 1/125 366/601 |
| 5,267,211 | A * | 11/1993 | Kobayashi | G06K 19/07 365/228 |
| 5,556,198 | A * | 9/1996 | Dickson, Jr. | A21C 1/14 366/100 |
| 6,072,494 | A * | 6/2000 | Nguyen | G06F 3/017 345/156 |
| 6,243,683 | B1 * | 6/2001 | Peters | G10L 15/24 434/4 |
| 6,246,683 | B1 * | 6/2001 | Connery | H04L 49/90 370/392 |
| 6,587,739 | B1 * | 7/2003 | Abrams | G05B 15/02 340/12.32 |
| 6,728,343 | B1 * | 4/2004 | Taylor | H04M 1/247 379/67.1 |
| 6,759,072 | B1 * | 7/2004 | Gutwein | A23F 5/243 426/429 |
| 7,270,156 | B2 * | 9/2007 | Beesley | A47J 43/046 141/82 |
| 8,487,905 | B2 * | 7/2013 | Kandziora | G06F 3/0412 345/174 |
| 9,857,828 | B2 * | 1/2018 | Aubauer | G06F 3/017 |
| 9,921,690 | B2 * | 3/2018 | Aubauer | G06F 3/044 |
| 10,048,135 | B2 * | 8/2018 | Koetz | G01K 11/265 |
| 10,182,680 | B2 * | 1/2019 | Koetz | A47J 36/00 |
| 10,332,065 | B2 * | 6/2019 | Ferguson | G06K 19/06028 |
| 2002/0009016 | A1 * | 1/2002 | Ancona | A47J 27/62 366/205 |
| 2002/0009017 | A1 * | 1/2002 | Kolar | A47J 27/62 366/206 |
| 2002/0167861 | A1 | 11/2002 | Barton et al. | |
| 2002/0176320 | A1 * | 11/2002 | Wulf | A47J 43/042 366/205 |
| 2004/0203387 | A1 * | 10/2004 | Grannan | G08C 17/00 455/41.2 |
| 2004/0267382 | A1 * | 12/2004 | Cunningham | H04L 12/2803 700/22 |
| 2005/0068846 | A1 | 3/2005 | Wulf et al. | |
| 2005/0196046 | A1 * | 9/2005 | Hudnut | A47J 37/00 382/218 |
| 2007/0081696 | A1 | 4/2007 | Brennan et al. | |
| 2008/0225636 | A1 * | 9/2008 | Kolar | A47J 43/07 366/206 |
| 2010/0061181 | A1 | 3/2010 | Malackowski et al. | |
| 2010/0270285 | A1 | 10/2010 | Qian et al. | |
| 2011/0029314 | A1 * | 2/2011 | Lin | A21C 15/002 704/270 |
| 2011/0149677 | A1 | 6/2011 | Davis et al. | |
| 2011/0187640 | A1 * | 8/2011 | Jacobsen | G02B 27/017 345/156 |
| 2011/0230238 | A1 * | 9/2011 | Aronsson | G06F 3/0386 455/566 |
| 2011/0312311 | A1 * | 12/2011 | Abifaker | G06F 3/017 455/418 |
| 2012/0111798 | A1 * | 5/2012 | Mundheim Ylikangas | B01D 17/0202 210/691 |
| 2012/0151420 | A1 * | 6/2012 | Amento | G06F 3/017 715/863 |
| 2012/0154108 | A1 * | 6/2012 | Sugaya | G06F 9/4443 340/5.1 |
| 2012/0206603 | A1 | 8/2012 | Rekimto et al. | |
| 2012/0220338 | A1 * | 8/2012 | Degrazia | H04M 1/72519 455/556.1 |
| 2013/0003490 | A1 * | 1/2013 | Kemker | A47J 27/62 366/142 |
| 2013/0021459 | A1 | 1/2013 | Vasilieff et al. | |
| 2013/0149678 | A1 * | 6/2013 | Tokuda | A47J 36/321 434/127 |
| 2013/0149679 | A1 * | 6/2013 | Tokuda | A47J 36/321 434/127 |
| 2014/0168062 | A1 | 6/2014 | Katz et al. | |
| 2014/0269154 | A1 * | 9/2014 | Kolar | B01F 15/00201 366/142 |
| 2015/0117137 | A1 | 4/2015 | Haney et al. | |
| 2015/0279370 | A1 * | 10/2015 | Koetz | A47J 43/0716 366/241 |
| 2015/0302375 | A1 * | 10/2015 | Holman | G06F 19/3462 705/15 |
| 2015/0305564 | A1 * | 10/2015 | Jimenez | A47J 43/046 366/141 |
| 2015/0305566 | A1 * | 10/2015 | Koetz | B01F 15/00 366/145 |
| 2015/0305567 | A1 * | 10/2015 | Koetz | A47J 43/046 366/144 |
| 2016/0000265 | A1 * | 1/2016 | Palmer | A47J 43/044 366/287 |
| 2016/0241653 | A1 * | 8/2016 | Ciepiel | H04L 67/22 |
| 2016/0249771 | A1 * | 9/2016 | Van Der Gaag | A47J 43/07 |
| 2018/0280175 | A1 * | 10/2018 | Sio | A61B 5/1176 |

FOREIGN PATENT DOCUMENTS

| | | | |
|---|---|---|---|
| DE | 10 2010 060 650 A1 | 5/2011 | |
| EP | 1 561 409 A1 | 8/2005 | |
| TW | M441164 U1 | 11/2012 | |
| WO | WO 2011/064145 | * | 6/2011 |
| WO | 2011/106350 A2 | 9/2011 | |

OTHER PUBLICATIONS

Machine Translation of WO 2011064145, as retrived EPO/Google on May 31, 2017, 10 pages.*
Gestural Control of Household Appliances for the Physically Impaired, Hans W. Guesgen and Darren Kessell, Proceedings of the Twenty-Fifth International Florida Artificial Intelligence Research Society Conference, pp. 353-358, (total 6 pages). Copyright 2012, Association for the Advancement of Artificial Intelligence (www.aaai.org).*
Hand gesture based remote control for home appliances : Handmote, Utpal V. Solanki and Nilesh H. Desai, 2011 World Congress on Information and Communication Technologies, pp. 419-423, 978-1-4673-0126-8/11/$26.00, copyright 2011 IEEE.*
Magicwand: An Intuitive Gesture Remote Control for Home Appliances, Authors: Kazushige Ouchit, Naoki Esaka, Yuka Tamural, Morio Hirahara:, and Miwako Doit, p. 274, (total 1 page), 0-7803-9035-0/05/$20.00, copyright 2005 LEEE.*
Abstract: Do JH., Jung JW., Jung S.H., Jang H., Bien Z. (2006) Advanced Soft Remote Control System Using Hand Gesture. In: Gelbukh A., Reyes-Garcia C.A. (eds) MICAI 2006: Advances in Artificial Intelligence. MICAI 2006. Lecture Notes in Computer Science, vol. 4293. Springer, Berlin, Heidelberg.*
International Search Report of PCT/EP2013/074797, dated Mar. 17, 2014.
International Search Report of PCT/EP2013/074807, dated Mar. 25, 2014.
International Search Report of PCT/EP2013/074798, dated Mar. 25, 2014.

* cited by examiner

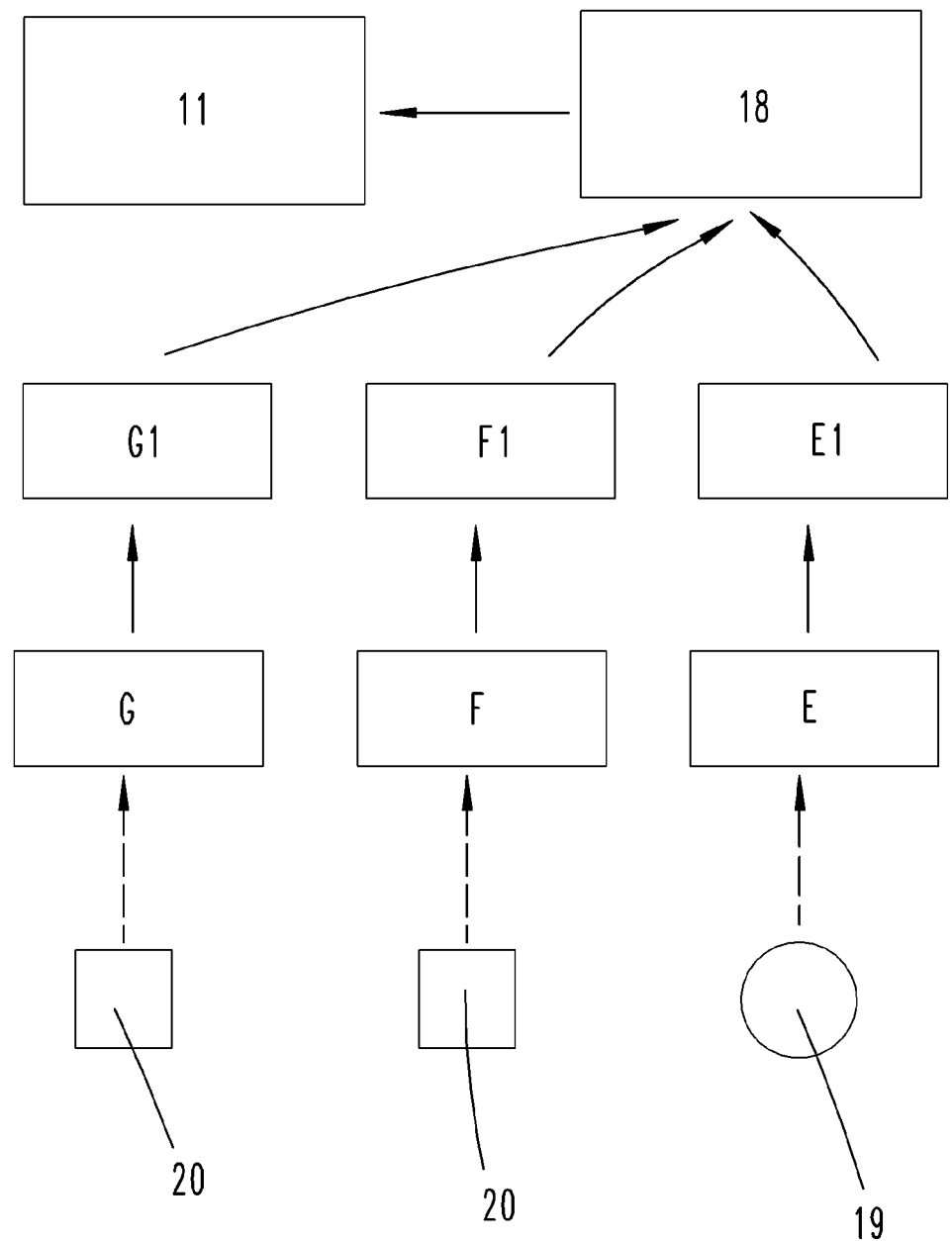

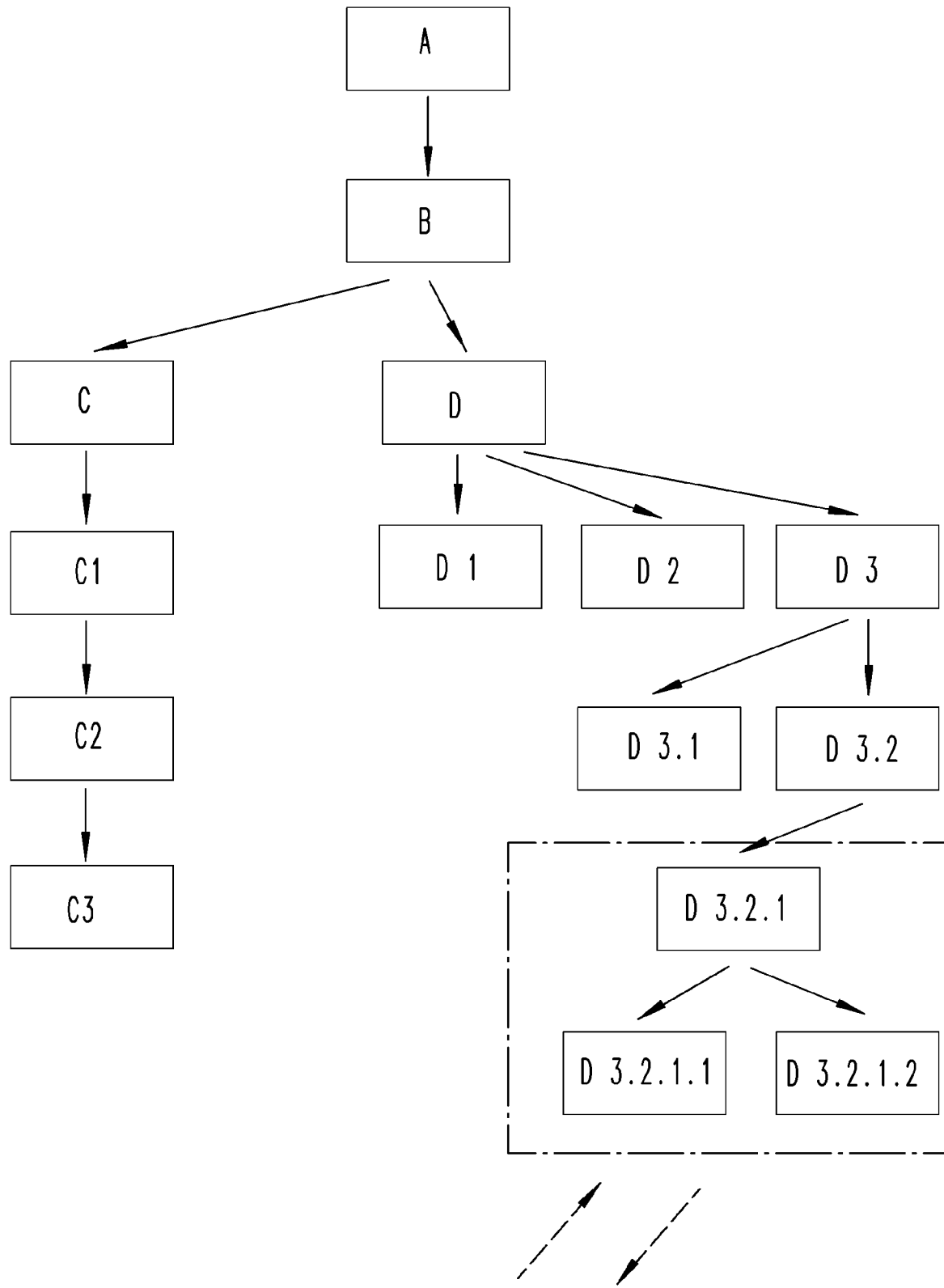

FOOD PROCESSOR

CROSS REFERENCE TO RELATED APPLICATIONS

This application is the National Stage of PCT/EP2013/074798 filed on Nov. 27, 2013, which claims priority under 35 U.S.C. § 119 of German Application No. 10 2012 111 603.2 filed on Nov. 29, 2012, the disclosure of which is incorporated by reference. The international application under PCT article 21(2) was not published in English.

The invention relates to an electrically operated food processor with a mixing bowl and a mixer in the mixing bowl.

Food processors of the type in question are known, for example from DE 102007059236 A1. The processing of food is possible by means of such food processors, the cooking of dishes is furthermore possible in the case of heatable mixing bowls, for the purpose of which in particular the heating power, which acts on the mixing bowl or on the content of the mixing bowl, respectively, can preferably be controlled by the user, and preferably also the direction of rotation and the rotary speed of the mixer in the mixing bowl, furthermore also the duration of the impact of heater and/or mixer, if applicable.

It is furthermore known to set in particular the above-mentioned parameters of the food processor at the food processor by means of electrical or electronic, respectively, or mechanical setting means, for example by means of rotary switches or push buttons. It is also known in this context to assign a preferably non-volatile memory, which offers a recipe selection, to the food processor. Such a recipe selection can preferably be displayed and selected on a display of the food processor. With regard thereto, reference is made to DE 102009055794 A1 or also to DE 102010060650 A1.

If the user selects a recipe stored in the food processor, preferably the parameters, which are to be set, such as temperature, mixer speed and duration of the program, if applicable, are provided and, if applicable, are set independently after confirmation by the user; they can furthermore be changed by the user, if applicable.

Based on the specified state of the art, the invention deals with the task of specifying a food processor, which is advantageous with regard to the implementation and use.

A possible solution of the task according to a first idea of the invention is at hand in the case of a food processor, which focusses on the food processor encompassing a camera, in particular an electronic camera, which is potentially directed towards the user of the food processor, and that a gesture recognition software as well as a gesture data bank are stored and that it is possible to use gesture recognition to cause the food processor to carry out a routine task.

In particular the setting of the parameters, such as speed, temperature and duration can preferably solely be set by gestures of the user. Preferably, complex routine tasks, which are stored as such in the food processor, can furthermore also be set by gestures of the user.

To set and carry out a certain command, the food processor does not need to be touched anymore. A user does not need to clean his hands prior to operating the food processor so as to avoid an impairment of the keypad or of the display.

The commands, which are assigned to the gesture, can be given to the food processor by means of simple gestures, which the user carries out at a distance from the food processor without physical contact thereto.

Provision is preferably made for a predetermined sequence of functions of the food processor to also be carried out by means of a defined sequence of suitable gestures.

In a preferred embodiment, the gestures are to be carried out by means of one hand, in the alternative by means of both hands. In addition, a movement of the head, for example, can also be defined as a gesture, which is to be carried out by the food processor.

An image is preferably captured continuously by means of the camera, which is installed in the food processor. If a user, if applicable a user, who was previously defined as authorized person, is located in a defined image section and at a distance—preferably between 0.4 and 2 m, more preferably approximately 1 m—to the camera, the captured image is examined and body or body parts, respectively, such as face or hands, are extracted.

The recognition preferably takes place by means of a common VGA camera. If the body of the recognized person is located in a stable position, the face recognition is initiated. The movement of a hand (right or left or both hands), for example, is hereby observed and analyzed continuously. For recognition, the movement of a hand, for example, is determined by calculating movement vectors. The differential image calculation, in which an extracted feature (the hand) is determined initially in consecutive images, and the position of which is searched in the analyzed images, is suitable for this. If a movement corresponds to a gesture, which was previously defined and which is stored in the gesture data bank, the function of the food processor, which is stored for this, is carried out.

Simple gestures are, e.g., forwards, backwards, upwards, downwards, counterclockwise, clockwise, pushing or also pulling. The comparison with a defined gesture data bank preferably takes place by means of a processor or microcontroller, respectively, which is integrated in the food processor. By defining simple vectors, the defined gestures can be displayed in a suitable manner. After a recognition has taken place, a routine task of the food processor is carried out as a function of a stored command or function, which is assigned to the gesture. For example, a cooking function is accessed and carried out.

Further features of the invention will be explained below, also in the figure description, often in their preferred assignment to the subject matter of claim 1 or to features of further claims. However, they can also be significant in an assignment to only individual features of claim 1 or of the respective further claim or in each case independently.

Provision is thus made in a more preferable embodiment for provision to be made for two cameras, in particular electronic cameras.

To avoid malfunctions, provision is made in a further development for (at least) the activation of the food processor to take place by means of the gesture recognition. A common operability of the food processor via switches, push buttons and/or a touchscreen, for example, can first be provided by means of the activation. Without the activation, a function of the food processor cannot be accessed and be carried out via the mentioned operating elements. It is possible for a certain gesture, a signal gesture, to be provided, only after the recognition of which by the food processor complete control of the food processor is made possible in terms of the common operability.

Provision can also be made hereby for the further operation of the food processor to be made possible via gestures after the signal gesture has been recognized.

In the alternative or in addition, provision can be made for an activation of a speech control to take place by means of a gesture recognition, in particular a recognition of the signal gesture. After the activation of the speech control, the food processor can be capable of being controlled alone or also in combination with the gestures by means of voice commands.

Provision is preferably also made that, in response to each of the mentioned control options, an operation and control of the food processor can additionally take place in the conventional manner by means of operating push buttons and/or a display.

A recipe selection is also possible in a more preferable manner by means of the gesture recognition. Assigned to a certain gesture, a selection of recipes can be offered or a certain recipe from the recipe data bank. In a preferred further development, the user is furthermore given the option to navigate through the menu of the recipe selection solely by means of gestures, thus for example by means of hand movements, which are inspired by the movement for operating a touchscreen.

In a further preferred embodiment, provision is made for a face recognition software as well as a face data bank to be stored and for the gesture recognition to be capable of being activated as a function of a face recognition.

It is preferred that the food processor can only be used with its functions after a facial image, which is present in the face data bank, has been recognized. With regard to a plurality of faces, which are stored in the face data bank, provision can also be made for one or a plurality of faces to be capable of being marked by a user, which is to enable only the use of the food processor.

It is also preferred that the manual operation of the food processor, that is, the operation of the individual setting elements, such as speed, temperature and duration setting element is possible only when a face, which is furthermore assigned to an authorized person, is recognized. Individual functions of the food processor can also be limited or deactivated in association with the faces or facial images, respectively, in the face data bank, whereas other functions can be activated, for example, so as to allow for a limited use of the food processor.

In a preferred embodiment, the food processor encompasses an electrode arrangement, if applicable in addition to the mentioned camera, for embodying an electromagnetic field.

A possible arrangement of the electrodes is according to a square. The square can be formed by four tracks or electrodes in an area of the control panel of the food processor.

A live electrode generates an electromagnetic field having a defined characteristic. The range of the electromagnetic field can be controlled as a function of the current. For a food processor, a range of between 10 and 30 cm, in particular 20 cm, is appropriate. If a hand or a human body part enters the electromagnetic field, the field is influenced by the conductivity of the human body, the force lines orient themselves on the body part and are grounded. This influence can be detected at the electrodes, from which the position of the body part can be calculated. Defined gesture can be recognized by means of the temporal shifting of the position of the body part and can be converted into machine commands.

It is also preferred for the gesture recognition to be activated when the food processor is turned on. When activating the food processor, for example as a result of operating a main switch or plugging a power plug into the power socket of the power supply of the house, the food processor is preferably in a so-called stand-by mode, in which the gesture recognition is activated at the same time.

In a more preferable embodiment, a heating and/or a running of the mixer is only carried out, if speed, temperature and duration are provided or are accepted in response to a corresponding proposal by the food processor. This means that in one case, the user must specify values for all three parameters, thus in particular for the speed, the temperature and the duration. The order can be provided hereby or can be queried successively, respectively, by a speech output of the food processor.

In the alternative, in particular in response to using a stored recipe, which was preferably accessed by means of a gesture command, an acoustic output of the parameters, such as speed, temperature and duration, which were set independently according to the recipe, can be confirmed by the user via the food processor, for example via gesture or speech input.

The software evaluation described above and below does not need to be made in the food processor. It can also be carried out, for example by means of radio contact to a computer located outside of the food processor or hand-held unit, such as a mobile telephone, for instance. It can also be carried out in a spatially remote computer ("cloud").

The invention will be explained below by means of the enclosed drawing, which, however, represents only an exemplary embodiment.

FIG. 2 shows a schematic illustration of the recognition software and data banks stored in the food processor to control the latter;

FIG. 3 shows a flowchart for illustrating an exemplary operation of the food processor.

Figure 1:
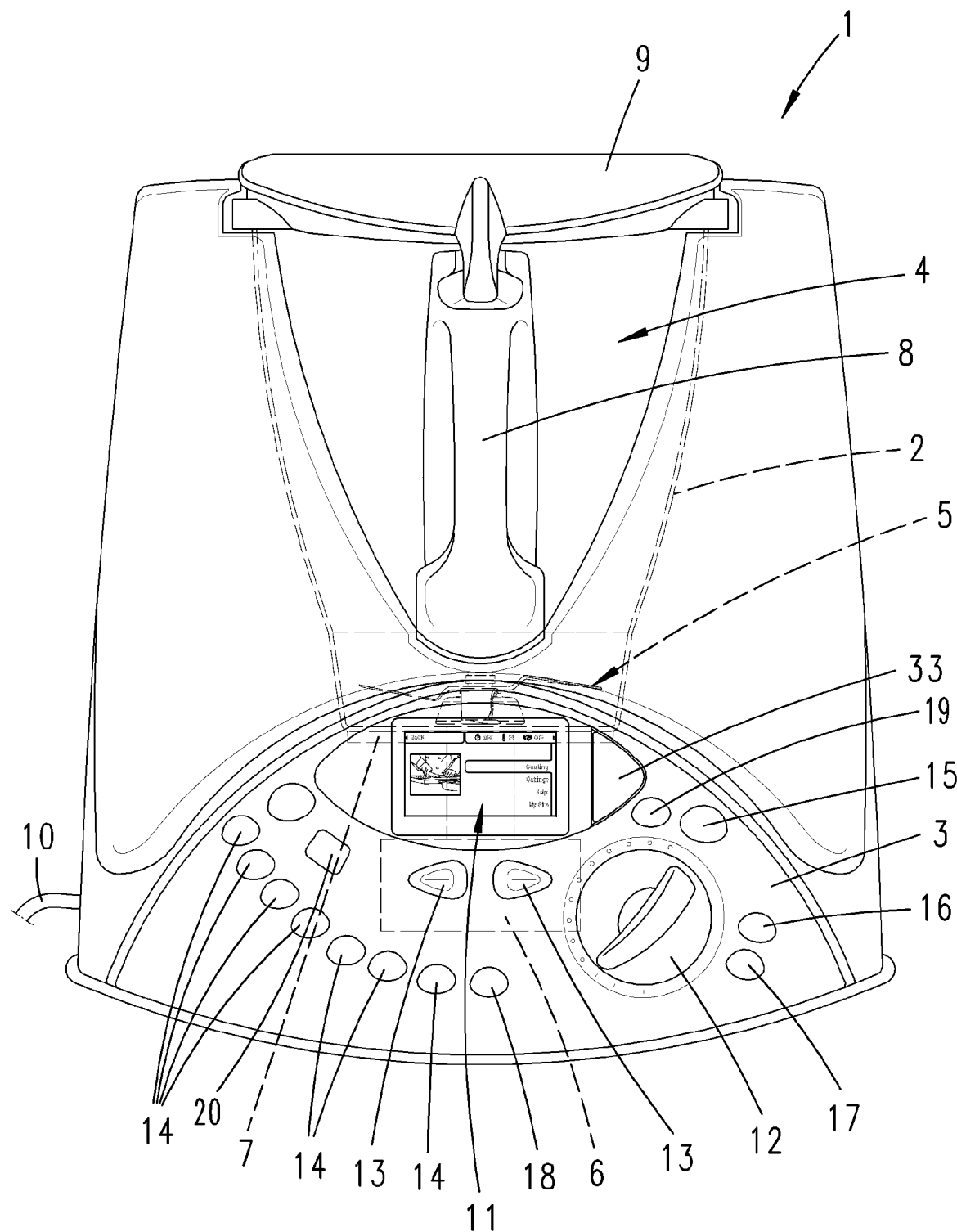
FIG. 1 shows a view of a food processor of the type in question with a mixing bowl accommodated in a mixing bowl accommodation, mechanical switches for setting variables as well as a display.

A food processor 1 with a mixing bowl accommodation 2 and a control panel 3 is illustrated and described initially with regard to FIG. 1.

A mixing bowl 4 can be assigned to the food processor 1, in that said mixing bowl is inserted into the mixing bowl accommodation 2, in particular in the base area of the mixing bowl 4, preferably with positive locking. Assigned to the mixing bowl bottom, provision is made in the mixing bowl 4 for a mixer 5, which is operated via an electric motor 6, which is arranged in the food processor 1 below the mixing bowl accommodation 2 and which is only illustrated schematically in the drawing. The mixer 5 remains in the mixing bowl 4 even if the latter is removed from the mixing bowl accommodation 2, for the purpose of which, in a more preferable manner, the mixer 5 is connected to the electric motor 6 via a torque proof plug-in coupling in the assigned position.

The bottom of the mixing bowl 4 can preferably be heated to heat a food to be cooked, which is located in the mixing bowl 4. Preferably, an electrical resistance heating 7, which is integrated in the bottom of the mixing bowl 4, is used here.

The mixing bowl 4 is preferably embodied in a pot-like manner comprising a substantially circular cross section, with a cross section, which widens conically to the pot opening, that is, towards the top. The pot wall preferably consists of a metal material.

The mixing bowl 4 furthermore encompasses a grab handle 8, which is preferably oriented vertically and which is fixed to the mixing bowl 4, for example on the base side as well as on the side of the pot edge.

The mixing bowl 4 is preferably assigned to the food processor 1 such that the grab handle 8 extends in a free-standing manner between device housing brackets, facing the control panel 3, wherein the base area of the mixing bowl 4 is supported on an integral bottom of the food processor 1 in the area of the accommodation 2, by coupling mixer drive and mixer 5 and preferably by electrically contacting the heater on the side of the mixing bowl bottom.

A bowl lid 9 can be attached to the mixing bowl 4. During operation of the food processor 1, further in particular during operation of the mixer 5 and/or of the resistance heating 7 on the bottom side, said bowl lid is locked in an attached position, more preferably to the housing of the food processor 1. Centrally, the bowl lid 9 has a non-illustrated filler opening.

The electric supply of the electric motor 6 as well as of the heater 7, which is more preferably provided on the bottom side of the mixing bowl, and furthermore also of the electrical control of the entire food processor 1 is attained via a power cord 10.

Initially, provision is preferably made in the control panel 3 for a display 11. More preferably, the control panel 3 supports one or a plurality of mechanical switches and controllers for setting different variables for the operation of the food processor 1. Initially, provision is thus preferably made for a rotary switch 12 for setting the speed of the mixer 5, whereby mixer speed stages are preferably selected via the rotary switch 12, and a provided mixer speed is assigned to each mixer speed stage.

Provision is made in the illustrated exemplary embodiment for two further mechanical switches in the form of push buttons 13, preferably below the display 11. With this, a duration can be input as variable, via which duration preferably the mixer 5 and/or the heater 7 of the mixing bowl 4 on the bottom side is activated.

In addition, provision can be made for a number of mechanical switches in the form of push buttons 14, via which different, provided temperatures can be selected. Preferably, these are temperatures in the range of from 37° C. to 100° C. By means of the chosen temperature and the mixer speed, which is chosen via the rotary switch 12, if applicable, heat is applied to the food to be cooked, which is located in the mixing bowl 4, for a period, which is provided by means of the push buttons 13.

In addition, provision can furthermore be made in the control panel 3 for further push buttons for recalling stored special functions, thus in particular a push button 15 for activating a turbo function, in response to which the mixer 5 is operated at a maximum speed for a short time, that is, preferably for a period of between 1 and 3 seconds, more preferably for a period, which corresponds to the period during which the push button is acted upon. More preferably, the turbo function thus leads to a temporary speed of the mixer 5 of more than 10.000 rpm, more preferably more than 12.000 rpm, up to 15.000 rpm, for example.

A further push button 16 preferably serves to activate a direction reversal function for the mixer 5. If, during normal operation, the mixer 5 preferably rotates clockwise, the push button 16 provides for the switchover to counterclockwise. The new direction of rotation can be maintained until the period specified via the push buttons 13 has expired. More preferably, the electronics of the food processor 1 (then) switches back into the standard direction of rotation independently. It is also possible to reverse the direction of rotation again by operating the push button 16 during the mixer operation again.

Provision is preferably furthermore made for a push button 17 for activating a dough mixing function, which is used in particular when making heavy yeast and bread doughs.

The variables, which are to be set via the rotary switch 12 as well as via the push buttons 13 to 17 or the functions, which are to be accessed, respectively, can preferably be displayed in the display 11.

A recipe data bank 18 is more preferably stored in the food processor 1. This recipe data bank includes a plurality of recipes for preparation in the food processor 1, preferably in a categorized manner. Preferably the parameters or variables, respectively, relating to the speed of the mixer 5, temperature of the resistance heating 7 and duration are assigned to each recipe. Preferably, the food processor 1 sets these variables independently or provides them to the user for confirmation with the activation of the recipe process.

In addition, users or user groups, for example, can be assigned to each recipe, so that every user of the food processor 1 can access his preferred recipes at the touch of a button, so to speak, without moving through the menu in a time-consuming manner. The latter is preferably displayed on the display 11 in the conventional manner. In one embodiment, said display 11 can be embodied as touchscreen.

In addition and parallel to an operation via an acoustic signal, the food processor 1 can preferably also be operated manually in the conventional manner, thus in particular as a result of operating rotary switch 12 and push buttons 13 to 17.

Preferably, the food processor 1 is activated initially for operation, more preferably solely by one or a plurality of authorized persons.

The authorization proof for activating the food processor and for activing the operating functions of the food processor is preferably attained by means of a speech control and/or a gesture control and/or a face recognition.

For this purpose, the food processor 1 more preferably encompasses a speech recognition software E and/or a face recognition software F and/or a gesture recognition software G. An acoustic transducer converter 19 in the form of a microphone is furthermore arranged in particular in the area of the control panel 3 in interaction with the speech recognition software E. The microphone as well as an electronic camera 20, which is provided more preferably, is potentially directed towards the user of the food processor 1 in the control panel 3. The camera 20 serves to capture images, which can be evaluated, in combination with the face recognition software F and/or the gesture recognition software G.

In response to the speech recognition, preferably the spoken word, in particular the command word or the acoustic pressure resulting therefrom, respectively, is converted into electrical signals and is processed and analyzed by a digital signal processor. After the continuous analysis of the received words and the comparison with a previously defined word list within a control data bank $E_1$, the signal processor returns the word having the highest probability, which corresponds to the spoken word. In a further step, a microcontroller analyzes the word, which is present in text form, and translates it into a machine command or into a recipe or converts it, respectively, such that a recipe is accessed specifically from the recipe data bank 18 and is displayed at least on the display 11. In a preferred further development, the transmission of the machine command to the recipe data bank 18 has the result that the parameters, such as speed, temperature and time, which belong to the accessed recipe or recipe section, are preset automatically.

As an alternative to or also in combination with the speech recognition, an image is captured continuously by using the camera 20, which is provided in the control panel 3, in particular for face recognition, furthermore as an alternative thereto or in combination therewith for gesture recognition. If a user is located in a defined image section and at a defined distance in front of the food processor 1, the image is examined, the face is extracted in the event of a face recognition, and is compared to a previously generated face data bank $F_1$. The comparison with the face data bank $F_1$ is attained by means of a processor, which is integrated in the food processor, wherein the face data bank $F_1$ as well as the further data banks are preferably stored in a non-volatile memory.

If a face, which has been stored in the face data bank $F_1$ as reference value, is recognized via the face recognition F, this recognition can lead to the translation into a machine command or into a recipe for selection from the recipe data bank 18, as in the case of speech recognition.

If a gesture of the user is recognized via the camera 20, for example an up and down movement of a hand, wiping with the hand, etc., this can preferably lead to the same operating commands as described above with regard to the face recognition or speech recognition.

If a user is located in a defined image section and at a distance, the captured image is examined and the body of the user or body parts, respectively, such as face or hands, is extracted. If the body of the recognized person is in a stable position, the gesture recognition G it initiated. The movement of a hand, for example, is hereby observed and analyzed continuously. For recognition, the movement of a hand is determined by calculating movement vectors. The differential image calculation, in which an extracted feature (for example the hand) is determined initially in consecutive images, and the position of which is searched in the analyzed images, is suitable for this. If a movement corresponds to a previously defined gesture from the gesture data bank $G_1$, the function of the food processor 1, which is stored for this, is executed, for example the setting of one or a plurality of parameters, such as speed, temperature or time, in addition the selection of a certain recipe from the recipe data bank 18.

In a preferred embodiment, the respective recognition for controlling the food processor 1 preferably in a contact-free manner—which is preferably possible in addition to the common manual control of the food processor 1—initially requires the food processor 1 to be turned on, in particular the activation thereof, for example via a main switch. In the alternative, the activation of the food processor can be attained by means of a certain voice command and/or gesture command and/or by recognizing a certain face, if applicable. The food processor 1 can thus preferably only be activated as a whole by recognizing a provided signal word or a provided gesture, whereby signal word or gesture preferably differ greatly from common words of gestures.

The activation of the food processor 1 can be limited to certain persons by means of a face recognition.

Based on this activation in point A in FIG. 3, the food processor 1 can be operated optionally under point B, it can thus be operated manually in the conventional manner on the one hand, on the other hand in a contact-free manner as a result of gesture and/or face and/or speech recognition.

Due to a certain command word and/or a certain gesture and/or due to a facial image in the face data bank, which is associated with corresponding parameters, the parameters can be set manually (point C) after activation, thus in particular the speed $C_1$, the temperature $C_2$ and the duration $C_3$, and/or the recipe data bank can be accessed under point D. Depending on the command word, face or gesture, all functions are activated or are available only to a limited extent.

As can furthermore be seen from the flowchart in FIG. 3, the recipes D are divided in a wide variety of submenus, for instance initially under the generic terms "sauces" D1, "meat" D2 and "baked goods" D3 in the illustrated exemplary embodiment, wherein the latter term, in turn, is divided into "cakes" D3.1 and "bread" D3.2.

The menu item "bread" offers a submenu "rolls" D3.2.1, among others, which, in turn, is divided into "wheat rolls" D3.2.1.1 and "rye rolls" D3.2.1.2, for example.

The recipe data bank can be maneuvered, for example via the speech recognition E, thus in particular as a result of command words, which correspond to the individual menu items (for example "recipes", "baked goods", "bread", etc.).

In the alternative, a submenu can also be accessed directly via the speech recognition E, for example by means of the word "rolls", in response to which the submenu is then displayed directly in the display 11.

As a further alternative, the possible submenu items are specified acoustically as a result of a speech output, in response to which the user can react with the corresponding command word. If the command word corresponds directly to a submenu, which is not subdivided further, for example "rye rolls" in the illustrated exemplary embodiment, the corresponding recipe is accessed directly and the parameters for speed, temperature and time are set, if applicable.

The gesture recognition and the routine task of the food processor 1 resulting therefrom is equivalent to the above-described speech recognition. Different gestures, in particular with the hand, lead to routine tasks of the food processor 1, which correspond to the respective gesture, thus for example, to accessing a certain recipe or to setting possible special functions of the food processor, such as the cake batter setting, for example.

When a certain face is recognized, a selection of recipes culminating in one recipe can be provided as a function of the parameters, which belong to the reference face stored in the data bank.

Regardless of whether a gesture recognition, a face recognition or a speech recognition can be used or is used or also a combination thereof, it is more preferable for the registered command, which is to be converted, to initially be queried optically, for example, in the display 11 or acoustically by means of speech output. In the case of a speech recognition, the user can react to this with yes or no, for example.

In a preferred embodiment, the setting of speed $C_1$ and/or temperature $C_2$ by means of a gesture and/or a word command is only converted into a corresponding action, if the duration $C_3$ has furthermore also been set. This can take place manually. In addition, a query can also be made so as to ask the user to also input the duration.

In the case of a gesture recognition, speed, temperature and/or time can be set, for example by continuously moving the hand upwards or moving it downwards.

The above descriptions serve to explain the inventions, which are covered as a whole by the application, which further develop the state of the art at least by means of the following feature combinations, in each case independently, namely:

A food processor, which is characterized in that the food processor 1 encompasses a camera 20, in particular an electronic camera, which is potentially directed towards the user of the food processor 1, and that a gesture recognition software as well as a gesture data bank $G_1$ are stored and that gesture recognition G can be used to cause the food processor 1 to carry out a routine task.

A food processor, which is characterized in that the gesture recognition G activates the food processor 1.

A food processor, which is characterized in that the gesture recognition G activates a speech control E of the food processor 1.

A food processor, which is characterized in that the gesture recognition G activates a recipe selection of the food processor 1.

A food processor, which is characterized in that a face recognition software as well as a face data base $F_1$ are stored and that the gesture recognition G can be activated as a function of a face recognition F.

A food processor, which is characterized in that the gesture recognition G is activated by turning on the food processor 1.

A food processor, which is characterized in that the gesture recognition G can only be deactivated by turning off the food processor 1.

A food processor, which is characterized in that a heating and/or a running of the mixer 5 is carried out only when speed $C_1$, temperature $C_2$ and duration $C_3$ are provided or are accepted in response to a corresponding suggestion from the food processor 1.

All of the disclosed features (alone) are relevant for the invention. The disclosure content of the corresponding/enclosed priority documents (copy of the earlier application) is also included in its entirety in the disclosure of the application, also for the purpose of adding features of these documents into claims of the instant application. With their features, the subclaims characterize independent inventive further developments of the state of the art, in particular so as to file divisional applications on the basis of these claims.

LIST OF REFERENCE NUMERALS

| 1 | food processor | A | activation |
|---|---|---|---|
| 2 | mixing bowl accommodation | B | selection |
| 3 | operating panel | C | parameter setting |
| 4 | mixing bowl | $C_1$ | speed |
| 5 | mixer | $C_2$ | temperature |
| 6 | electric motor | $C_3$ | duration |
| 7 | resistance heating | D | recipes |
| 8 | grab handle | D1 | sauces |
| 9 | bowl lid | D2 | meat |
| 10 | power cord | D3 | baked goods |
| 11 | display | D3.1 | cake |
| 12 | rotary switch | D3.2 | bread |
| 13 | push button | D3.2.1 | rolls |
| 14 | push button | D3.2.1.1 | wheat rolls |
| 15 | push button | D3.2.1.2 | rye rolls |
| 16 | push button | E | speech recognition |
| 17 | push button | $E_1$ | command data bank |
| 18 | recipe data bank | F | face recognition |
| 19 | acoustic transducer | $F_1$ | face data bank |
| 20 | camera | G | gesture recognition |
|  |  | $G_1$ | gesture data bank |

The invention claimed is:

1. An electrically operated food processor comprising:
(a) a mixing bowl;
(b) a mixer in the mixing bowl;
(c) a camera for recognizing a gesture comprising a movement of at least a portion of a body of a user of the food processor; said camera having a detection area, and that the detection area of the camera is not directed on the food processor but to an environment of the food processor at a distance of between 0.4 and 2 meters where the user may stand and gesture;
(d) a processor comprising gesture recognition software; and
(e) a memory comprising a gesture data bank for storing gestures;
wherein only recognition of a first gesture stored in the gesture data bank activates the food processor and provides an operability via mechanical interfaces, via speech control and via second gestures stored in the gesture data bank, alone or in combination with each other, only after activation by recognition of the first gesture, wherein the food processor further comprises a heater for heating the mixing bowl and an electric motor for running the mixer, wherein the food processor is arranged to carry out the heating and the running of the mixer only when a speed of the mixer, a temperature of the mixing bowl, and a duration of at least one of the running of the mixer at the speed and the heating of the mixing bowl at the temperature is provided or is accepted by operation of the mechanical interfaces, speech control and second gestures.

2. The food processor according to claim 1, further comprising an acoustic transducer interacting with speech recognition software for receiving acoustic pressure from a word spoken by the user, wherein the function comprises speech control activation of the food processor causing the food processor to be controlled by voice commands.

3. The food processor according to claim 1, wherein the memory further comprises a recipe data bank for storing recipes and wherein the function comprises selection of a recipe from the recipe data bank of the food processor.

4. The food processor according to claim 1, wherein the processor further comprises a face recognition software and the memory further comprises a face data base for storing faces and wherein recognition of a face from the face data bank causes the food processor to be controlled by the recognition of a second gesture stored in the gesture data bank.

5. The food processor according to claim 1, further comprising a power cord for supplying electricity to the food processor for electrical control of the food processor, wherein electrical control of the food processor is configured to be selectively turned on and turned off, and wherein turning on the electrical control of the food processor causes the food processor to be controlled by the recognition of a second gesture stored in the gesture data bank.

6. The food processor according to claim 5, wherein turning off the electrical control of the food processor causes the food processor to cease being controlled by the recognition of the second gesture in the gesture data bank.

7. The food processor according to claim 1, further comprising a display for displaying values of speed of the mixer, temperature of the mixing bowl, and duration of at least one of the running of the mixer at the speed and the heating of the mixing bowl at the temperature.

8. The food processor according to claim 1, wherein the first gesture comprises the movement of one or two hands.

9. The food processor according to claim 1, wherein the food processor carries out the function when the movement of one or two hands is steadily observed by means of consecutive images taken by the camera.

10. The food processor according to claim 1, further comprising an electrode arrangement comprising four electrodes arranged in a square in an area of a control panel of the food processor, wherein a live electrode of the four electrodes is configured to generate an electromagnetic field having a range of between 10 and 30 centimeters, wherein at least one electrode of the four electrodes is configured to detect an influence on the electromagnetic field of a human body part entering the electromagnetic field, from which influence a position of the human body part is calculated, wherein defined gestures of the human body part are recognized from a temporal shifting of the position of the human body part, and wherein the defined gestures are converted into machine commands.

11. A method for operating an electrically operated food processor, the method comprising the steps of:

providing a mixing bowl, a mixer in the mixing bowl, a camera for recognizing a gesture comprising a movement of at least a portion of a body of a user of the food processor, the camera having a detection area, a processor comprising gesture recognition software, a memory comprising a gesture data bank for storing gestures, a heater for heating the mixing bowl and an electric motor for running the mixer;

directing the detection area of the camera not on the food processor but to an environment of the food processor at a distance of between 0.4 and 2 meters where the user may stand and gesture;

activating the food processor by recognition of a first gesture stored in the gesture data bank to provide an operability via mechanical interfaces, via speech control and via second gestures stored in the gesture data bank, alone or in combination, wherein only recognition of the first gesture stored in the gesture data bank activates the food processor to enable the operability;

carrying out the heating and the running of the mixer only when a speed of the mixer, a temperature of the mixing bowl, and a duration of at least one of the running of the mixer at the speed and the heating of the mixing bowl at the temperature is provided or is accepted by operation of the mechanical interfaces, speech control and second gestures.

12. The method according to claim 11, further comprising the step of interacting an acoustic transducer with speech recognition software for receiving acoustic pressure from a word spoken by the user, wherein the function comprises speech control activation of the food processor causing the food processor to be controlled by voice commands.

13. The method according to claim 11, further comprising the steps of storing recipes in a recipe data bank of the memory and selecting a recipe from the recipe data bank of the food processor.

14. The method according to claim 11, further comprising the steps of providing face recognition software in the processor, storing faces in a face data base of the memory, recognizing a face from the face data bank and upon recognition of the face, causing the food processor to be controlled by the recognition of a second gesture stored in the gesture data bank.

15. The method according to claim 11, further comprising the steps of providing a power cord for supplying electricity to the food processor for electrical control of the food processor and configuring the electrical control of the food processor to be selectively turned on and turned off, wherein turning on the electrical control of the food processor causes the food processor to be controlled by the recognition of a second gesture stored in the gesture data bank.

16. The method according to claim 15, further comprising the step of causing the food processor to cease being controlled by the recognition of the second gesture in the gesture data bank by turning off the electrical control of the food processor.

17. The method according to claim 11, further comprising the step of displaying values of a speed of the mixer, a temperature of the mixing bowl, and a duration of at least one of the running of the mixer at the speed and the heating of the mixing bowl at the temperature on a display.

18. The method according to claim 11, wherein the first gesture comprises the movement of one or two hands.

19. The method according to claim 11, further comprising the step of steadily observing a movement of one or two hands by consecutive images taken by the camera in order for the food processor to carry out the function.

20. The method according to claim 11, further comprising the steps of generating an electromagnetic field having a range of between 10 and 30 centimeters with a live electrode of four electrodes arranged in a square in an area of a control panel of the food processor, detecting an influence on the electromagnetic field of a human body part entering the electromagnetic field with at least one electrode of the four electrodes, calculating a position of the human body part from the influence on the electromagnetic field, recognizing defined gestures of the human body part from a temporal shifting of the position of the human body part, and converting the defined gestures into machine commands.

* * * * *